United States Patent
Demler, Sr.

[15] 3,674,292
[45] July 4, 1972

[54] TUBULAR CONNECTION DEVICES
[72] Inventor: Henry William Demler, Sr., Lebanon, Pa.
[73] Assignee: AMP Incorporated, Harrisburg, Pa.
[22] Filed: Oct. 15, 1969
[21] Appl. No.: 866,631

Related U.S. Application Data

[63] Continuation-in-part of Ser. Nos. 755,410, Aug. 26, 1968, abandoned, Ser. No. 710,946, March 6, 1968, abandoned, Ser. No. 676,583, Oct. 19, 1967, abandoned, Ser. No. 587,944, Oct. 18, 1966, abandoned, which is a continuation-in-part of Ser. No. 517,747, Dec. 30, 1965, Pat. No. 3,378,282.

[52] U.S. Cl..............................285/174, 29/237, 29/507, 29/508, 29/520, 29/523, 264/249, 285/156, 285/256, 285/272, 285/382, 285/382.4
[51] Int. Cl..........................................F16l 33/22, F16l 47/00
[58] Field of Search................285/256, 382.2, 382.4, 382.5, 285/255, 252, 258, 174, 382; 29/237, 507, 508, 520, 523

[56] References Cited

UNITED STATES PATENTS

| | | | |
|---|---|---|---|
| 3,370,870 | 2/1968 | Mahoff | 285/382.2 X |
| 3,528,689 | 9/1970 | Roe | 285/382.2 |
| 2,086,703 | 7/1937 | Eastman | 285/256 X |
| 3,149,860 | 9/1964 | Hallesy | 285/382 X |
| 2,309,719 | 2/1943 | Vaill | 285/256 X |
| 2,556,544 | 6/1951 | Johnson | 285/256 X |
| 3,498,648 | 3/1970 | Hallesy | 285/382.2 X |
| 3,476,412 | 11/1969 | Demler | 285/382.2 X |
| 3,375,026 | 3/1968 | Szohatzky | 285/38.2 X |
| 1,969,548 | 8/1934 | Eastman | 285/256 |
| 1,186,813 | 6/1916 | McFerran | 285/382.2 X |

FOREIGN PATENTS OR APPLICATIONS

| | | | |
|---|---|---|---|
| 1,305,575 | 9/1963 | France | 285/382.4 |

Primary Examiner—Thomas F. Callaghan
Attorney—Curtis, Morris and Safford, William J. Keating, Ronald D. Grefe, William Hintze, Adrian J. La Rue, Frederick W. Raring, Jay L. Sietchik and John P. Vandenburg

[57] ABSTRACT

A tubular connection device for connection to an end of a tubular member comprises a tubular body member and into which the end of the tubular member is disposed, the tubular body member having an outer surface and a ferrule member being axially movable along the body member causing the body member under the ferrule member to be decreased in diameter into tight and sealing engagement with the tubular member. The outer surface and the ferrule member are provided with tool-engaging areas for moving the ferrule member into position on the body member.

7 Claims, 22 Drawing Figures

Inventor
HENRY WILLIAM DEMLER SR
By Adrian J. LaRue

TUBULAR CONNECTION DEVICES

CROSS REFERENCE TO RELATED APPLICATIONS

This application is a continuation-in-part of copending applications, Ser. No. 755,410, filed Aug. 26, 1968, now abandoned, Ser. No. 710,946, filed Mar. 6, 1968, now abandoned, Ser. No. 676,583, filed Oct. 19, 1967 now abandoned and Ser. No. 587,944, filed Oct. 18, 1966, now abandoned the latter application being a continuation-in-part of copending application, Ser. No. 517,747, filed Dec. 30, 1965, and now Pat. No. 3,378,282.

This invention relates to tubular connection members, a tool for applying them to conduit members and a method of applying the connection members to conduit members.

In the field of conduit, tubular or pipe couplings, a variety of connection members have been used, such as, threaded nut members mating with threaded ends of a body member; soldering, gluing or welding ends of the conduit members to be coupled onto a tubular member of slightly less diameter or into a tubular member of slightly greater diameter; threading the ends of the conduit members to mate with the threaded portions of a coupling member; flaring one end of a conduit member and inserting the end of another conduit member therein in telescopic relationship; etc.

These connection members and types similar thereto involve a large amount of time and labor to apply them to the tubular members in addition to the fact that some of them are expensive.

It is, therefore, a primary object of the present invention to provide connection members which are easily applied to tubular members to interconnect same.

Another object of the present invention is the provision of connection members which are inexpensive and which, when applied to tubular members to interconnect them, provide a sealed connection capable of withstanding pressure.

An additional object of the present invention is to provide connection members which may be substantially transparent for observation and indication purposes, acts like a snubber curbing vibration and acts as an insulator.

A further object of the invention is the provision of connection members to connect plastic-lined pipe which maintains the inside diameter constant throughout the connection members.

A still further object is to provide connection members having means on the body thereof in which one part of a tool is disposed to assist in axially moving ferrule means into engagement with the body of the connection members.

Still an additional object of the invention is the provision of connection members having means on the body thereof to secure ferrule means thereon.

A further additional object of the invention is to provide a connection device in which serrated inserts are secured so as to cause the end of a tubular member to flow into sealing engagement with the serrations when the ferrule member is moved into position.

A still further additional object of the invention is to provide a connection device having serrations on an outer surface which are reformed on an inner surface of the connection device when the ferrule member is moved into position thereby deforming a tubular member in accordance with the configuration of the serrations to increase the sealing and tensile characteristics.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

The foregoing and other objects are achieved by a preferred embodiment of a connection member to interconnect ends of tubular conduit members which comprises a hollow tubular member having a centrally located annular shoulder on an interior surface, the ends of the tubular conduit members being disposed within the tubular member against the annular shoulder, the tubular member being provided with means on an exterior surface, for engagement with a jaw member of a tool means, ferrule members axially movable along the tubular conduit members and along sections of the tubular member by another jaw member of the tool means, and means on the ferrule members and on the tubular member to secure the ferrule members in position on the tubular member to sealingly secure the tubular conduit members in position in the tubular member.

Figure 1:
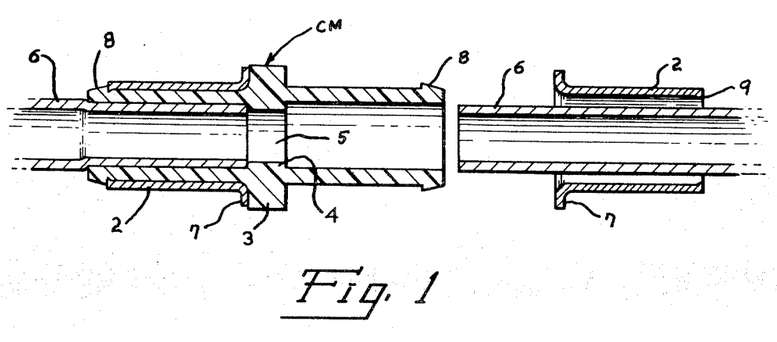
FIG. 1 is a cross-sectional view of a connection member having one end connected to a tubular member and a tubular member and ferrule member exploded therefrom.
Figure 2:
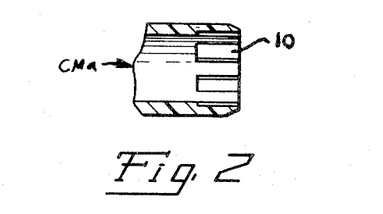
FIG. 2 is a partial cross-sectional view of an alternative embodiment of the connection member of FIG. 1.
Figures 3, 4, 5:
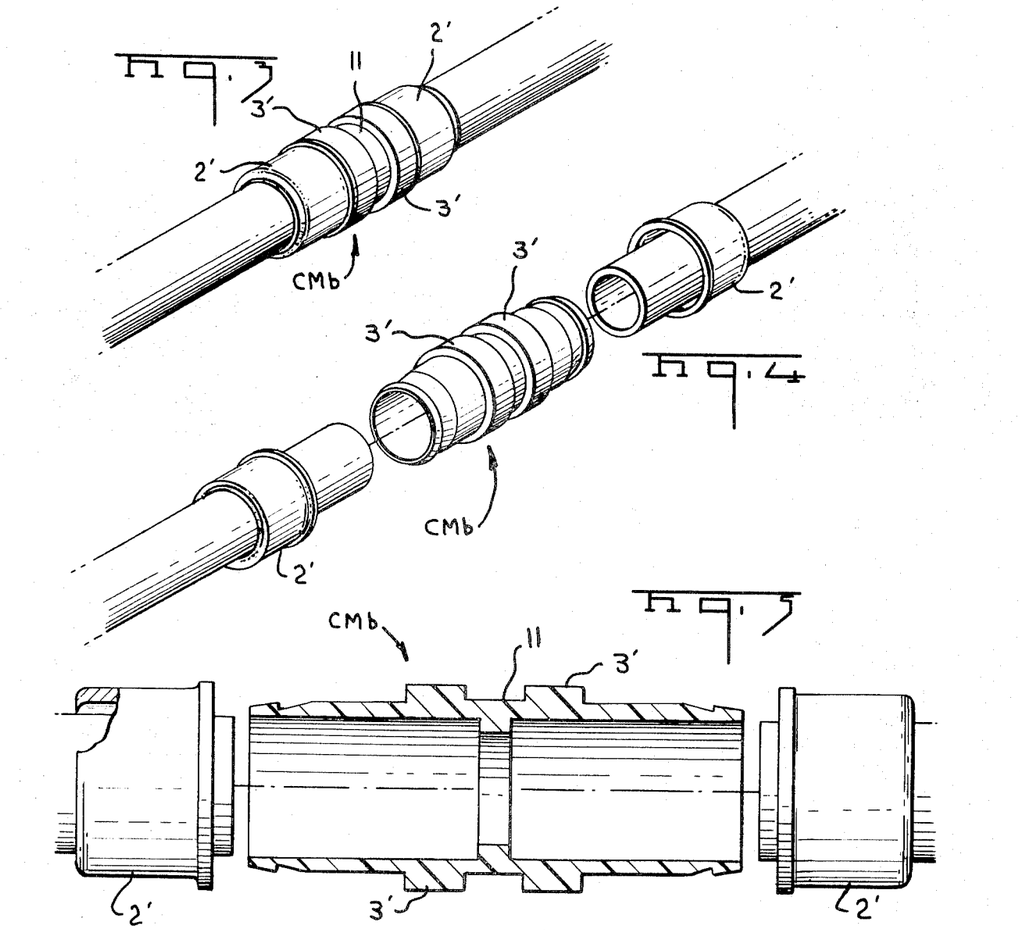
FIG. 3 is an assembled connection of another embodiment of the connection member.
FIG. 4 is an exploded perspective view of the elements of FIG. 3.
FIG. 5 is an exploded and cross-sectional view of FIG. 4.

FIGS. 1 and 2 illustrate embodiments of connection members CM and CMa which comprise a hollow body member 1 and ferrule members 2. Hollow body member 1 is preferably molded of yieldable material and preferably of plastic material in accordance with conventional molding techniques and includes a centrally located annular projection 3 on the exterior surface thereof and an annular shoulder 4 located on the interior surface of the body member opposite projection 3. Annular shoulder 4 has an opening 5 extending therethrough. The interior surface of body member 1 from shoulder 4 to each outer end thereof has the same diameter in order to receive the ends of tubular members 6 with the ends of the tubular members abutting against shoulder 4 in order to limit the inner movement thereof within body member 1 as well as to allow equal portions of the tubular members to be disposed within the body member. The exterior surfaces of body member 1 on each side of projection 3 and at the outer ends thereof are slightly tapered to facilitate movement of the ferrule members in position on the body member.

Ferrule members 2 are slightly tapered from one end to the other end and the ends of the ferrule members having the largest diameter are flared outwardly to form a flange 7. The taper of ferrule members 2 corresponds to that of the exterior surfaces on each side of projection 3 of body member 1 except that the diameters along the exterior surfaces of body member 1 are slightly greater than that of the corresponding diameters of ferrule members 2. However, ferrule members 2 can have the same diameter therealong except at flanged ends 7 and inwardly-directed ends 9.

Projections 8 are located on the exterior surface of body member 1 at the ends thereof and the outer ends of ferrule members 2 have inwardly-directed sections 9. Projections 8 and inwardly-directed sections 9 define securing means to secure the ferrule members in position on the body member. The ends of the ferrule members may of course be made without the inwardly-directed sections and projections 8 would still secure the ferrule members in position.

In assembly, ferrule members 2 are pushed onto the ends of corresponding tubular members 6, the ends of the tubular members are disposed within body member 1 until they abut against annular shoulder 4, ferrule members 2 are then manually shoved onto the tapered sections of body member 1 and jaw members 10 (see FIGS. 6 and 9) of a suitable tool engage flanges 7 of the ferrule members and move the ferrule members axially along body member 1 until flanges 7 engage annular projection 3. One of jaw members 10 can be brought into engagement with projection 3 while the other of jaw members 10 is brought into engagement with flange 7 of one of the ferrule members to axially move this ferrule member into position on the body member thereby securing the tubular member thereunder within the body member. The same procedure is repeated to move the other ferrule member into position on the other end of the body member except that the one jaw member is disposed against the flange of the just-positioned ferrule member.

Since the tapered surfaces of body member 1 are slightly greater than the internal tapered surfaces of ferrule members 2, the ferrule members cause the tapered sections of body member 1 to be slightly decreased in diameter thereby causing the tapered sections to snugly and sealingly engage the ends of the tubular member. Depending upon the types of material used, the ends of the tubular member can be slightly necked down upon ferrule members 2 being axially moved along the tapered sections of body member 1. If desired, the outer ends of the interior surfaces of body member 1 of connection member CMa may be provided with depressions 1a as illustrated in FIG. 2 similar to depressions 49 of connection members CM in FIG. 18 of the above-mentioned application. Of course, the interior surfaces of body member 1 can be provided with any other configuration to effect the desired result.

Figure 6:
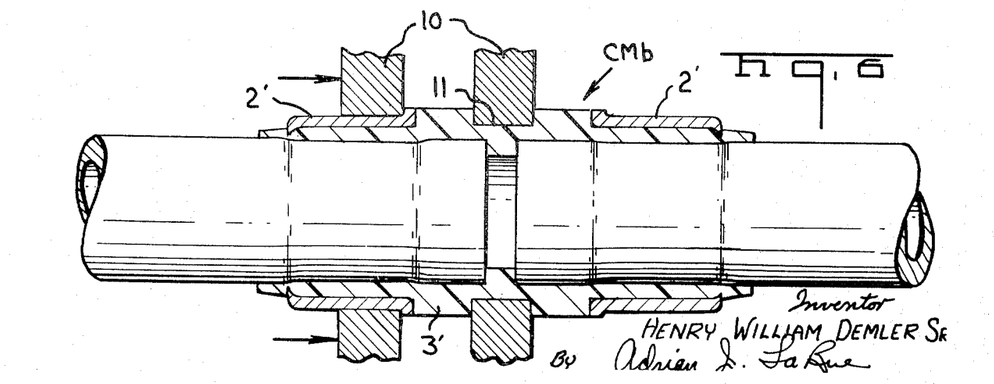
FIG. 6 is a cross-sectional view of FIG. 3.

FIGS. 3 through 6 illustrate connection member CMb which is another embodiment of the connection member CM. Connection member CMb is similar to connection member CM except that annular projection 3' includes an annular groove 11 disposed therein. This annular groove is for the purpose of placing one of jaw members 10 in engagement with the groove so as to provide sufficient gripping area to permit the tool to move ferrule members 2' into position onto the hollow body member and into engagement with annular projection 3' as illustrated in FIG. 6. Otherwise, connection member CMb is similar to connection member CM and the ends of the interior surface of the hollow body member can be provided with depressions 10 in the manner of connection member CMa of FIG. 2.

Figure 7:
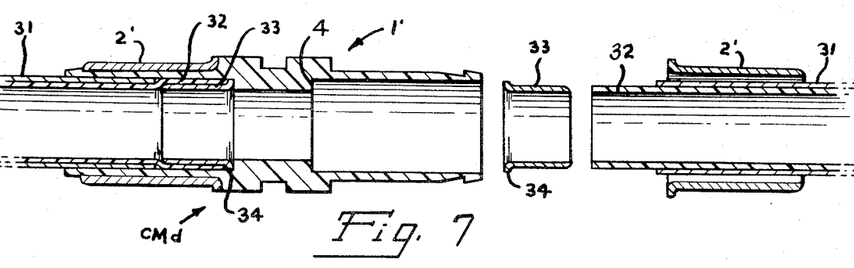
FIG. 7 is a cross-sectional view of an embodiment of the connection member having one end connected to a tubular member and a tubular member and ferrule members exploded therefrom.
Figure 8:
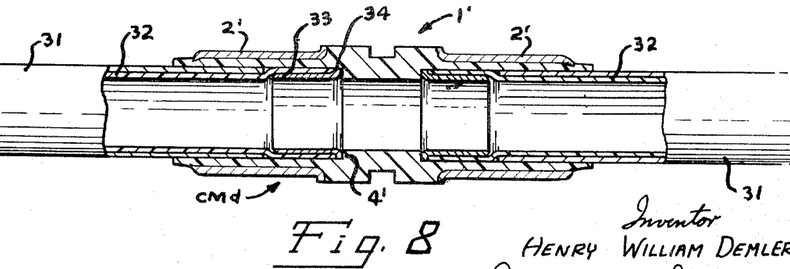
FIG. 8 is a view similar to FIG. 7 but with the connection member in assembled condition interconnecting tubular members.

Connection member CMd, illustrated in FIGS. 7 and 8, is an additional embodiment of the connection member which is similar to the connection member illustrated in FIGS. 3 through 6. In fact, this connection member is identical to the connection member of FIGS. 3 through 6 and is used to interconnect pipe members 31 having a plastic lining 32 of stiffly-flexible material such as, for example, polyethylene or the like.

In order to connect the ends of pipe members 31 within body member 1' of connection member CMd, the ends of pipe members 31 are cut off to expose a length of plastic lining 32 slightly longer than ferrule members 33. Ferrule members 33 are inserted within plastic linings 32 of stripped pipe members 31 until the ends of plastic linings 32 engage flanges 34 of ferrule members 33. The inside diameter of ferrule members 33 is the same as the inside diameter of pipe members 31 thereby stretching plastic lining 32 when ferrule members 33 are inserted therewithin. The leading edges of ferrule members 33 are beveled to provide for a smooth transition between the stripped ends of pipe members 31 and ferrule members 33. After ferrule members 33 have been inserted within plastic linings 32, ferrule members 2' are inserted onto respective pipe members and the ends of the pipe members are inserted within body member 1' until flanges 34 of ferrule members 33 abut against annular shoulder 4'. Ferrule members 2' are then axially moved along body member 1 by jaw members 10 of the tool means as described hereinbefore to secure the ends of pipe members 31 in position within the connection member as illustrated in FIG. 8. Plastic lining 32 between the inside surface of body member 1' and ferrule members 33 provide an effective seal and the inner diameter along the connection member is substantially constant throughout the connection member.

Figure 9:
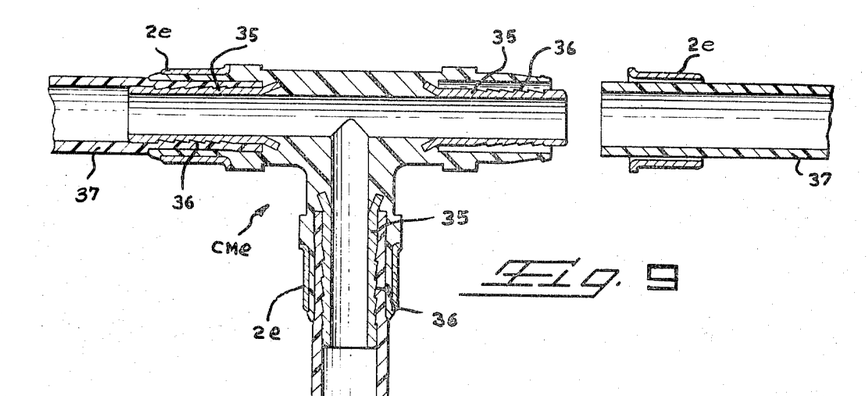
FIG. 9 is a cross-sectional and exploded view of a further embodiment.

FIGS. 9–12 illustrate connection members which are similar to those of FIGS. 3–6, 7 and 8 except that connection member CMe of FIG. 9, which illustrates a T-shaped connection member, has inserts 35 molded in position during the formation of the connection member. Inserts 35 are provided with serrated surfaces 36 so that pliable tubular members 37, when they are disposed onto the inserts, are caused to flow into tight engagement with the serrated surfaces of the inserts when ferrule members 2e are axially moved into position on the body of the connection member thereby securely sealing the tubular members within the connection member. This type of connection will withstand sizeable tensile forces and provide a long leakage path. Connection member CMe can, of course, be an elbow or straight connection member or of any other suitable configuration.

Figure 10:
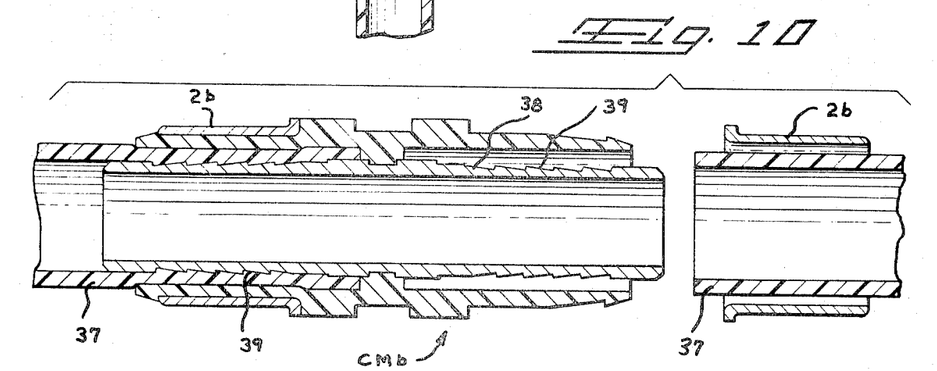
FIG. 10 is a view similar to FIG. 9 of an additional embodiment.

FIG. 10 illustrates a through insert 38 provided with serrated surfaces 39 which is molded in position in the body of connection member CMf during the formation thereof; otherwise, this connection member is the same as connection member CMe of FIG. 9 and operates in the same manner to sealingly secure tubular members 37 in position via ferrule members 2f.

Figures 11, 12:
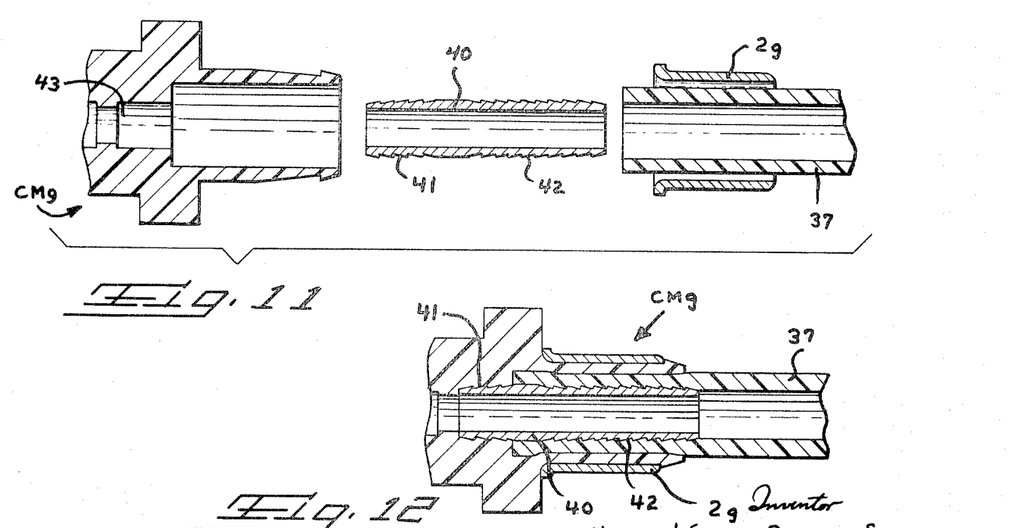
FIG. 11 is an exploded cross-sectional view of a still further embodiment.
FIG. 12 illustrates the parts of FIG. 11 in an assembled condition.

FIGS. 11 and 12 illustrate connection member CMg wherein insert 40 has serrated surfaces 41, 42 with serrated surface 41 being pushed into section 43 of the body as illustrated in FIG. 12 thereby securing the insert 40 in position while serrated surface 42 operates as heretofore explained to sealingly secure the tubular member 37 in position via ferrule member 2g. Section 43 sealingly flows around serrated surface 41 when insert 40 is pushed into position and this causes the insert to be also secured therein.

Figure 13:
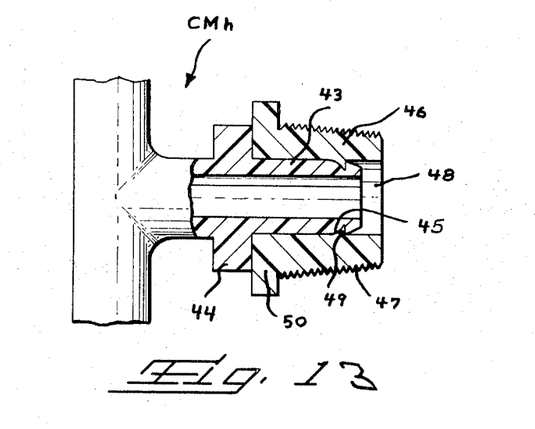
FIGS. 13–15 illustrate embodiments of connection devices for connecting to a threaded coupling member.
Figure 14:
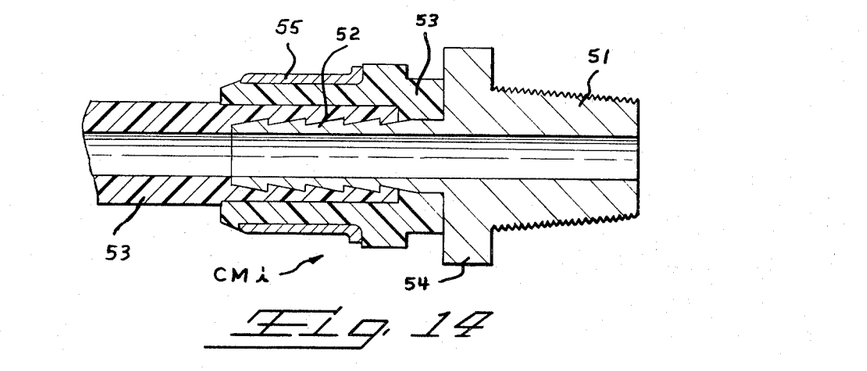
Figure 15:
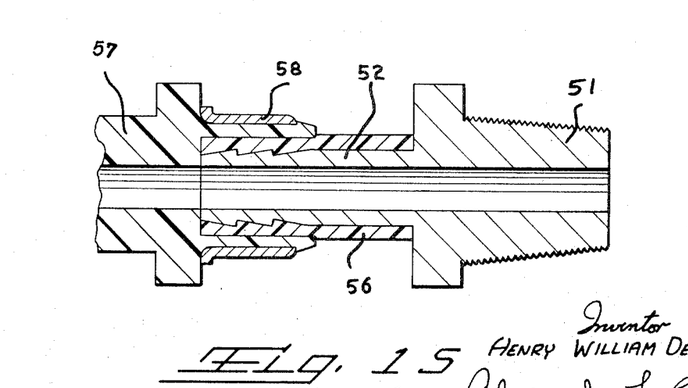

Turning now to FIGS. 13–15, FIG. 13 illustrates a connection device CMh of the T-shaped or other configuration which is secured onto tubular members in the manner of FIG. 9 and it includes a tubular section 43 provided with a flange 44 and a groove 45. A member 46 is provided with tapered threads 47 and an opening 48 extending therethrough. Tubular section 43 is disposed in opening 48 and groove 45 snapably mates with a projection 49 in opening 48 to maintain member 46 on tubular section 43 and to permit member 46 to be rotatable thereon. Member 46 is provided with a wrench-engaging section 50 which is disposed adjacent flange 44.

When tapered threads 47 mate with a threaded-pipe coupling (not shown) to couple connection member CMh to a pipe, the surface of opening 48 of member 46 is tightly and sealingly moved into engagement with tubular section 43 to provide a sealed connection.

FIG. 14 illustrates connection device CMi which comprises a threaded-coupling member 51 for threadable engagement with a threaded pipe or the like. Member 51 includes a barbed section 52 onto which a pliable tubular member 53 is frictionally disposed. Barbed section 52 has a tubular-engaging member 53 disposed thereon adjacent wrench-engaging flange 54. Tubular-engaging member 53 is similar in configuration to one end of the connection members heretofore disclosed in FIGS. 1–6, 7 and 8 and ferrule member 55 is axially moved along member 53 as also heretofore disclosed thereby sealingly securing the part of tubular member 53 disposed between barbed section 52 and member 53 therebetween.

FIG. 15 discloses connection device CMj. Barbed section 52 of threaded coupling member 51 has a piece of pliable tubing 56 disposed thereon and it is secured in sealing engagement therewith via one end of connection member 57 and ferrule member 58, connection member 57 being as heretofore disclosed and taking any desirable form such as straight through, elbow, Tee, etc.

Figure 16:
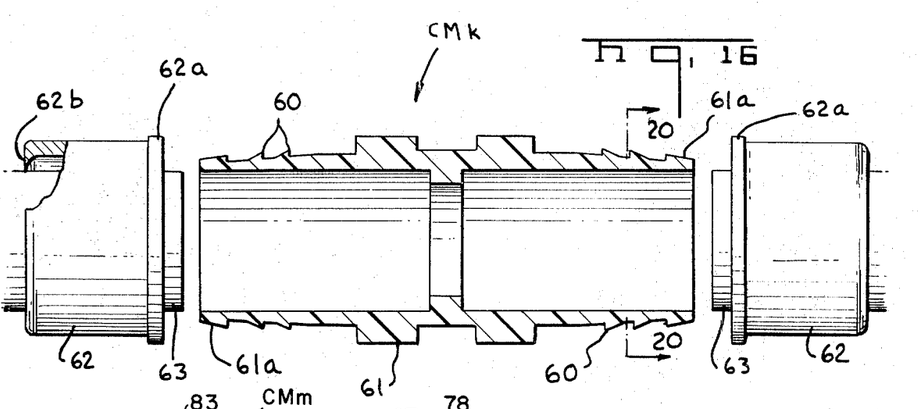
FIG. 16 is an exploded partially-sectioned view of a still further additional embodiment.
Figure 17:
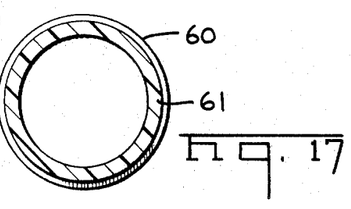
FIG. 17 is a view taken along lines 17—17 of FIG. 16.
Figure 18:
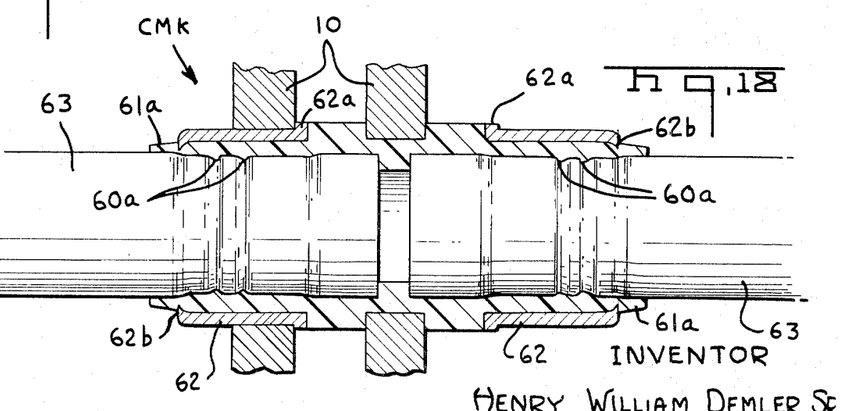
FIG. 18 is a view similar to FIG. 16 but in an assembled condition.

Connection device CMk is illustrated in FIGS. 16–18 and this embodiment is similar to connection device CMb of FIGS. 3–6 except that serrations 60 are located on the outer surfaces of the body member 61 along the areas onto which ferrules 62 are moved via jaw members 10 as hereinbefore described. Serrations 60 are preferably annular but they can be of any desired configuration.

When ferrules 62 are moved into position on the body member after tubular members 63 are positioned within the body member, serrations 60 are reformed as corresponding serrations 60a on the inner surface of the body member as a result of the flowability of the material of the body member which is brought about by the compressive pressure of the ferrules as illustrated by FIG. 18. The reformation of serrations 60 as serrations 60a deforms ends of the tubular members in accordance with the configuration of the reformed serrations and the sealing and tensile characteristics of the connection formed between the connection device and tubular members are increased.

Ferrules 62 may on the one hand be provided with tapered internal surfaces corresponding to that of the tapered external surfaces of the body member but of slightly smaller size as hereinbefore disclosed; however, on the other hand, the internal surfaces of the ferrules may have a constant diameter therealong or at least substantially all of the length thereof except at one of the ends where flanges 62a are located for engagement by one of jaw members 10 and at the other of the ends where inwardly-directed sections 62b are located for engagement against projections 61a to secure the ferrules in position on body 61.

As disclosed hereinbefore, the external surfaces of the body members may be of constant diameter therealong except for slightly tapered sections at the outer ends thereof and the internal surfaces of the ferrule members may have the same diameter therealong except at the flared-outwardly and flared-inwardly ends and the outside diameter of the external surfaces is greater than the inside diameter of the ferrule members. When these surfaces are mated by the tool means moving the ferrule members along the external surfaces of the body members with the outwardly-flared ends and the slightly tapered sections facilitating starting of the ferrule members along the external surfaces, the external surfaces are reduced in size because of the difference in diameters between the external surfaces and the ferrule members thereby causing the body members along the external surfaces to neck down onto tubular members disposed therein.

Such an approach permits progressively reducing the cross-sectional area of the tubing and the body member along the crimping area and the total cross-sectional area of reduction along the length of the ferrule-receiving section is about 10 percent. This requires less force than is required if both mating surfaces were tapered since the tapered surfaces approach simultaneously reduces the entire cross-sectional area along the length of the crimping area of the body member when the ferrule member is moved into position therealong.

Figure 19:
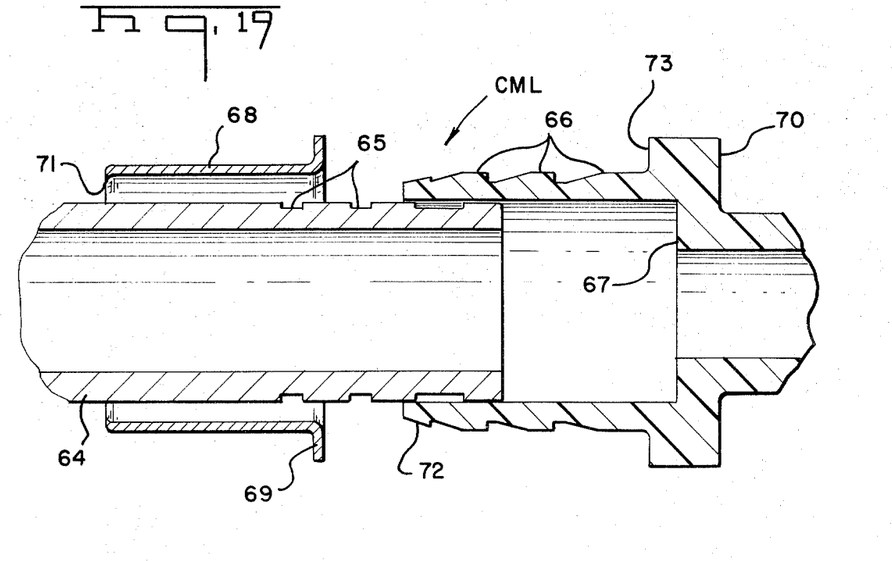
FIG. 19 is a cross-sectional view of elements of still an additional embodiment prior to being assembled.
Figure 20:
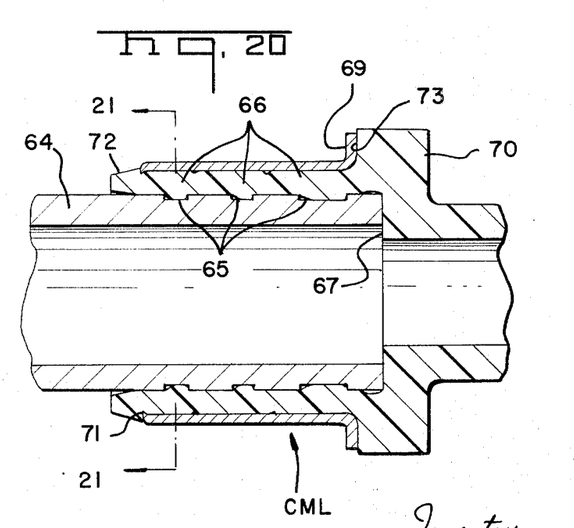
FIG. 20 shows the coupling member of FIG. 19 in an assembled condition.
Figure 21:
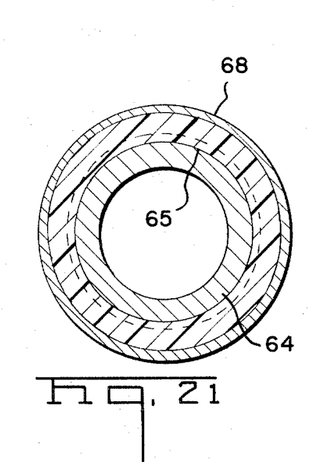
FIG. 21 is a view taken along lines 21—21 of FIG. 20.

Connection device or coupling member CMl is illustrated in FIGS. 19–21 and this embodiment is similar in configuration to that of the embodiment of FIGS. 16–18 but it is used primarily on metal pipe 64 which has grooves 65 formed therein on the outside surface. These grooves 65 are positioned in the outside surface of pipe 64 so as to be in alignment with serrations or annular projections 66 on the body member of the coupling member when the pipe is positioned on the inside of the body member against surface 67. The innermost annular projection 66 is larger than the other projections and the innermost groove 65 is larger than the other grooves to accommodate the larger projection. The reason the large inner projection is larger than the other projections is to provide sufficient material at an area at which greatest tension occurs when the connection undergoes any axial force.

With the end of pipe 64 in the body member abutting surface 67 and ferrule member 68 on pipe 64, flange 69 of ferrule member 68 is engaged by one of the jaw members 10 of the tool while the other of jaw members 10 is in engagement with section 70 of the body member. The tool is operated and ferrule member 68 is moved along annular projections 66 causing them, as a result of the pressure created by the ferrule member thereon, to flow inwardly and be reformed on the inside surface of the body member within grooves 65 and the inside surface of the body member on each side of the grooves snugly and sealingly engages the pipe due to the pressure of the ferrule member necking down the ferrule-receiving area of the body member.

It has been found, as set forth in the prior applications, that the diameter of the annular projections is the same and it is slightly greater than the internal constant diameter of the ferrule member from the radiused entrance of the ferrule member at flange 69 to an inwardly-directed lip 71 at the trailing end of the ferrule member which is lodged inwardly from or against annular projection 72, as illustrated in FIG. 20, when the ferrule member is positioned on the ferrule-receiving area extending between projection 72 and surface 73 on the body member thereby securing the ferrule member on the ferrule-receiving area to prevent the ferrule member from working off of the ferrule-receiving area.

The reforming of annular projections 66 within grooves 65 via the action of ferrule member 68 provides axially spaced sealing areas between the body member of the coupling member and the pipe in addition to the snug and sealing engagement of the inner surface of the body member against adjacent areas of the pipe on each side of the grooves. The reforming of annular projections 66 within grooves 65 also provides a connection having excellent tensile strength between the coupling member and the pipe as well as anti-torquing characteristics. The grooves also provide the feature of permitting space for the movement of the plastic material of the body member during any expansion or contraction of the plastic material so that effective sealing is maintained at all times. This is an important feature due to the differential of expansion and contraction between the plastic body member and the metal ferrule and pipe.

The radiused entrance to ferrule member 68 at flange 69 and the beveled edge of projection 72 on the body member facilitate the movement of the ferrule member onto the ferrule-receiving area. Each of projections 66 but the most inner one has a tapered leading surface, a flat top surface and a trailing surface which is disposed generally normal with respect to a longitudinal axis of the coupling member. The tapered leading surfaces of projections 66 facilitate movement of the ferrule member therealong so that the pressure created by the ferrule member effects reformation of the projections on the inner surface of the body member and within respective grooves 65 with trailing surfaces being substantially straight thereby increasing the tensile strength of the connection.

Of course, axially-disposed striations or grooves may be formed in the outer surface of the pipe outwardly from the outermost groove to cause extrusion of the plastic material of the body member thereinto when the ferrule member is seated on the ferrule-receiving area thereby increasing resistance to any torquing action.

If desired, the depth of grooves 65 may vary with the greatest depth occurring with the innermost groove and varying in depth with the other grooves as a function of the distance away from the end of the pipe. This will of course provide greater tensile strength if such is needed. The spacing between the annular projections is such that it provides room for the movement of the annular projections when they are placed under compression via the ferrule member.

Figure 22:
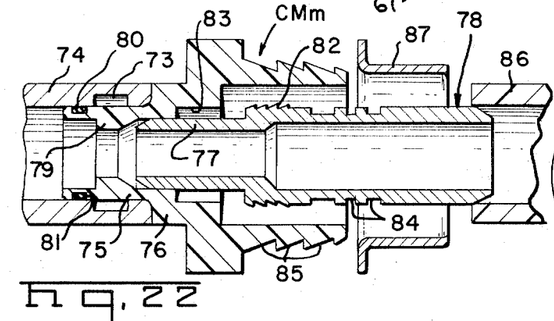
FIG. 22 is an exploded sectional view of another embodiment.

FIG. 22 illustrates coupling member CM*m* which is similar to CM*l* except that groove 73 is on the inside of pipe 74 and tubular section 75 of body member 76 is disposed on the inside of pipe 74 so that when tubular section 77 of rigid insert 78 is forcefully driven into tubular section 75, projection 79 is caused to flow and be reformed on the exterior surface of tubular section 75 and into groove 73 to form a seal between the pipe and the tubular section. The inner end of projection 79 and the outer end of section 77 are beveled to facilitate movement of section 77 along projection 79. An O-ring 80 is disposed in a groove 81 on tubular section 75 and the diameter of section 77 is such that tubular section 75 is sealingly expanded against the inside surface of the pipe.

Serrations 82 are provided on insert 78 and these dig into the wall of annular section 83 of the body member to secure the insert therein. Grooves 84 are located in the exterior surface of insert 78 and they are positioned in alignment with annular projections 85 which are caused to be reformed and drive areas of plastic pipe 86 into grooves 84 when pipe 86 is positioned on insert 78 and ferrule member 87 is forcefully moved into position on the ferrule-receiving area of the body member.

As can be discerned, there has been disclosed connection members to interconnect tubular or conduit members in a positive and sealed manner therewithin.

It will, therefore, be appreciated that the aforementioned and other desirable objects have been achieved; however, it should be emphasized that the particular embodiments of the invention, which are shown and described herein, are intended as merely illustrative and not as restrictive of the invention.

What is claimed is:

1. A tubular connection comprising:
a rigid pipe having an internal annular groove on an inside surface inwardly from an end thereof, a body member having a tubular section of resiliently yieldable material inserted within the end of said rigid pipe, an annular projection on an inner surface of said tubular section in alignment with said annular groove, a rigid generally tubular insert forcibly received internally of said tubular section and disposed along an interior surface of said tubular section, said rigid insert having caused said projection to be reformed on an exterior surface of said tubular section and in registration within said groove means, said exterior surface of said tubular section sealingly expanded radially against said inside surface of said pipe with said tubular section being retained in resilient compression between said rigid insert and said rigid pipe, and connection means provided by said insert and said body member permanently securing said insert in said body member.

2. The structure as recited in claim 1, wherein, said connection means includes external annular projecting serrations in biting registration within an interior wall of said body member.

3. The structure as recited in claim 2, wherein, said projection and said tubular insert are provided with cooperating beveled portions facilitating forcible insertion of said tubular insert within said tubular section.

4. The structure as recited in claim 3, and further including: an O-ring in resilient compression between said tubular section and said rigid pipe.

5. A tubular connection comprising:
a rigid pipe having groove means on an inside surface inwardly from an end thereof, a body member of yieldable material having a tubular section disposed along said inside surface of said pipe, annular projection means on an inner surface of said body member in alignment with said annular groove means, insert means disposed along an interior surface of said tubular section, said insert means having caused said projection means to be reformed on an interior surface of said tubular section and into said groove means in said exterior surface to be sealingly expanded against the inside surface of said pipe, means provided by said insert means and said body member securing said insert means in said body member, said insert means has groove member means on an exterior surface, a malleable pipe disposed on said insert means along said groove member means, a ferrule-receiving area along said body member and having annular projection member means in alignment with said groove member means, and ferrule means disposed on said ferrule-receiving area and placing said ferrule-receiving area under compression whereby said annular projection member means has been reformed on an inside surface of said body member thereby moving the area of said malleable pipe within said groove member means.

6. A connection for plastic pipe, comprising:
a body connection member of resiliently deformable plastic, a rigid cylindrical tubular insert permanently secured internally of said body connection member, said body connection member having an enlarged diameter portion provided with a relatively smooth inner surface, said tubular insert having a grooved portion internally of and radially spaced from the relatively smooth interior surface of said enlarged diameter portion, a plastic pipe having an end portion freely received internally of said enlarged diameter portion and freely received over said tubular insert grooved portion, the external surface of said grooved portion being received against the interior surface of said plastic pipe end portion, said tubular insert grooved portion including a plurality of separated annular grooves in the exterior surface thereof, said separated annular grooves being spaced from each other along the length of said tubular insert, said separated annular grooves being of non-threaded configurations, said body connection member including a plurality of separated annular projecting serrations on the exterior thereof in radial spaced relationship with respect to said relatively smooth inner surface, said annular serrations being of resiliently deformable plastic and integral with said body connection member, said annular serrations being of non-threaded configurations, said annular serrations being spaced from each other and spaced longitudinally along the length of said body connection member, each of said annular serrations being radially aligned with only a single annular groove provided in said tubular member, a substantially cylindrical rigid ferrule axially slidably received over and compressibly received over said serrations, said serrations being individually resiliently compressibly reformed on the relatively smooth interior surface of said body connection member and forming a plurality of radially inward projections protruding from said relatively smooth interior surface and forcibly resiliently deforming corresponding distinctly separate annular portions of said plastic pipe into radial registration with said separated grooves of said rigid tubular insert, with only one annular portion of said plastic pipe in registration within a single corresponding one of said separated grooves, said plastic pipe being fixedly secured in said body connection member by said reformed serrations and fixedly secured in said grooves of said grooved portion of said rigid tubular insert, with said plastic pipe and said enlarged diameter portion of said body connection member being retained in resilient radial compression between said rigid cylindrical tubular insert and said rigid cylindrical ferrule, and means permanently retaining said ferrule on said body connection member.

7. The structure as recited in claim 6, and further including:

a plurality of external serrations integral with and projecting from the external surface of said cylindrical tubular insert, said serrations being spaced from said grooved portion of said cylindrical tubular insert and permanently engaged in said body member, whereby said tubular insert is permanently secured internally of said body connecting member.

* * * * *